(12) United States Patent
Klemets et al.

(10) Patent No.: US 7,548,948 B2
(45) Date of Patent: Jun. 16, 2009

(54) CLIENT-SIDE CACHING OF STREAMING MEDIA CONTENT

(75) Inventors: Anders E. Klemets, Redmond, WA (US); Troy D. Batterberry, Kirkland, WA (US); Eduardo P. Oliveira, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/267,377

(22) Filed: Nov. 4, 2005

(65) Prior Publication Data

US 2006/0059223 A1 Mar. 16, 2006

Related U.S. Application Data

(62) Division of application No. 10/179,770, filed on Jun. 24, 2002.

(51) Int. Cl.
*G06F 15/16* (2006.01)
(52) U.S. Cl. ............... 709/203; 709/218; 709/219; 709/226; 709/229; 709/231
(58) Field of Classification Search .............. None
See application file for complete search history.

(56) References Cited

U.S. PATENT DOCUMENTS

| 4,963,995 | A | 10/1990 | Lang |
|---|---|---|---|
| 5,057,932 | A | 10/1991 | Lang |
| 5,132,964 | A | 7/1992 | Esaki |
| 5,164,839 | A | 11/1992 | Lang |
| 5,262,875 | A | 11/1993 | Mincer et al. |
| 5,440,334 | A | 8/1995 | Walters et al. |
| 5,568,181 | A | 10/1996 | Greenwood et al. |
| 5,710,970 | A | 1/1998 | Walters et al. |
| 5,758,076 | A | 5/1998 | Wu et al. |
| 5,787,472 | A | 7/1998 | Dan et al. |
| 5,822,524 | A | 10/1998 | Chen et al. |
| 5,822,537 | A | 10/1998 | Katseff et al. |
| 5,835,495 | A | 11/1998 | Ferriere |
| 5,850,449 | A | 12/1998 | McManis |

(Continued)

FOREIGN PATENT DOCUMENTS

WO    WO0143445    6/2001

(Continued)

OTHER PUBLICATIONS

"Congestion Control Mechanism for TCP with Packet Pair Scheme" IEICE Transactions on Information and Systems Institute of Electronics Information and Comm. Egn. Tokyo JP vol. E82-D No. 4 Apr. 1999 pp. 854-862.

(Continued)

*Primary Examiner*—Bunjob Jaroenchonwanit
*Assistant Examiner*—Van Kim T Nguyen
(74) *Attorney, Agent, or Firm*—Merchant & Gould P.C.

(57) ABSTRACT

Various functionality with respect to streaming media content is made available to users. Such functionality includes one or more of: streaming media content at a rate independent of the encoded bit rate of the content, allowing streaming of content to continue even when the user has selected various shuttle control options (e.g., pause, stop, fast forward, seek, rewind, etc.), allowing streaming content to be recorded for playback at a later time, and allowing streaming content to be time-shifted.

11 Claims, 8 Drawing Sheets

U.S. PATENT DOCUMENTS

| | | | |
|---|---|---|---|
| 5,872,920 A | 2/1999 | Hausman et al. | |
| 5,890,010 A | 3/1999 | Nishigami | |
| 5,913,038 A | 6/1999 | Griffiths | |
| 5,931,961 A | 8/1999 | Ranganathan et al. | |
| 5,963,202 A | 10/1999 | Polish | |
| 5,978,567 A | 11/1999 | Rebane et al. | |
| 5,983,263 A | 11/1999 | Rothrock et al. | |
| 5,995,705 A | 11/1999 | Lang | |
| 5,996,015 A | 11/1999 | Day et al. | |
| 6,005,621 A | 12/1999 | Linzer et al. | |
| 6,014,694 A | 1/2000 | Aharoni et al. | |
| 6,014,706 A | 1/2000 | Cannon et al. | |
| 6,041,345 A | 3/2000 | Levi et al. | |
| 6,054,943 A | 4/2000 | Lawrence | |
| 6,111,567 A | 8/2000 | Savchenko et al. | |
| 6,118,817 A | 9/2000 | Wang | |
| 6,120,149 A | 9/2000 | Hosoi | |
| 6,161,201 A | 12/2000 | Payne et al. | |
| 6,195,692 B1 | 2/2001 | Hsu | |
| 6,209,041 B1 | 3/2001 | Shaw et al. | |
| 6,216,163 B1 | 4/2001 | Bharali et al. | |
| 6,262,990 B1 | 7/2001 | Ejiri | |
| 6,272,148 B1 | 8/2001 | Takagi et al. | |
| 6,292,834 B1 | 9/2001 | Ravi et al. | |
| 6,292,880 B1 * | 9/2001 | Mattis et al. | 711/216 |
| 6,314,492 B1 | 11/2001 | Allen et al. | |
| 6,327,421 B1 | 12/2001 | Tiwari et al. | |
| 6,329,165 B1 | 12/2001 | Chattoraj et al. | |
| 6,343,298 B1 | 1/2002 | Savchenko et al. | |
| 6,351,767 B1 * | 2/2002 | Batchelder et al. | 709/219 |
| 6,369,835 B1 | 4/2002 | Lin | |
| 6,385,647 B1 | 5/2002 | Willis et al. | |
| 6,405,256 B1 | 6/2002 | Lin et al. | |
| 6,407,680 B1 | 6/2002 | Lai et al. | |
| 6,421,348 B1 | 7/2002 | Gaudet et al. | |
| 6,449,269 B1 | 9/2002 | Edholm | |
| 6,480,498 B1 | 11/2002 | Gaudet et al. | |
| 6,484,199 B2 | 11/2002 | Eyal | |
| 6,493,748 B1 | 12/2002 | Nakayama et al. | |
| 6,502,135 B1 | 12/2002 | Munger et al. | |
| 6,553,376 B1 | 4/2003 | Lewis et al. | |
| 6,611,868 B1 | 8/2003 | Arutyunov | |
| 6,611,898 B1 * | 8/2003 | Slattery et al. | 711/118 |
| 6,614,763 B1 | 9/2003 | Kikuchi et al. | |
| 6,643,259 B1 | 11/2003 | Borella et al. | |
| 6,691,312 B1 | 2/2004 | Sen et al. | |
| 6,725,333 B1 * | 4/2004 | Degenaro et al. | 711/118 |
| 6,735,634 B1 | 5/2004 | Geagan, III et al. | |
| 6,757,255 B1 | 6/2004 | Aoki et al. | |
| 6,760,749 B1 | 7/2004 | Dunlap et al. | |
| 6,760,765 B1 | 7/2004 | Asai et al. | |
| 6,765,878 B1 | 7/2004 | Carlson | |
| 6,772,375 B1 | 8/2004 | Banga | |
| 6,779,043 B1 | 8/2004 | Crinion | |
| 6,785,288 B1 | 8/2004 | Enns et al. | |
| 6,792,449 B2 | 9/2004 | Colville et al. | |
| 6,801,947 B1 | 10/2004 | Li | |
| 6,877,010 B2 * | 4/2005 | Smith-Semedo et al. | 707/102 |
| 6,892,354 B1 | 5/2005 | Servan-Schreiber et al. | |
| 6,952,424 B1 | 10/2005 | Bass et al. | |
| 6,954,430 B2 | 10/2005 | Haglund | |
| 6,986,018 B2 * | 1/2006 | O'Rourke et al. | 711/213 |
| 6,990,070 B1 | 1/2006 | Aweya et al. | |
| 6,990,512 B1 | 1/2006 | Major et al. | |
| 7,007,090 B1 | 2/2006 | Spangler et al. | |
| 7,020,087 B2 | 3/2006 | Steinberg et al. | |
| 7,051,110 B2 | 5/2006 | Hagai et al. | |
| 7,054,774 B2 | 5/2006 | Batterberry et al. | |
| 7,054,911 B1 | 5/2006 | Lango et al. | |
| 7,054,949 B2 | 5/2006 | Jennings | |
| RE39,184 E * | 7/2006 | Schloss et al. | 711/122 |
| 7,185,082 B1 | 2/2007 | del Val et al. | |
| 2002/0047899 A1 | 4/2002 | Son et al. | |
| 2002/0048448 A1 | 4/2002 | Daniels | |
| 2002/0049817 A1 | 4/2002 | Drory et al. | |
| 2002/0077900 A1 | 6/2002 | Thompson et al. | |
| 2002/0090027 A1 | 7/2002 | Karczewicz | |
| 2002/0097727 A1 | 7/2002 | Prakash | |
| 2002/0138641 A1 | 9/2002 | Taylor et al. | |
| 2002/0170067 A1 | 11/2002 | Norstrom et al. | |
| 2002/0194608 A1 * | 12/2002 | Goldhor | 725/91 |
| 2003/0018799 A1 | 1/2003 | Eyal et al. | |
| 2003/0055809 A1 * | 3/2003 | Bhat | 707/1 |
| 2003/0099364 A1 | 5/2003 | Thompson et al. | |
| 2003/0236902 A1 | 12/2003 | Weiss | |
| 2003/0236912 A1 | 12/2003 | Klemets et al. | |
| 2004/0003101 A1 | 1/2004 | Roth et al. | |
| 2004/0054912 A1 | 3/2004 | Adent et al. | |
| 2004/0244010 A1 | 12/2004 | Kleyman et al. | |
| 2005/0152400 A1 | 7/2005 | Suzuki | |
| 2005/0157714 A1 | 7/2005 | Shlissel et al. | |
| 2005/0256941 A1 | 11/2005 | Armstrong et al. | |

FOREIGN PATENT DOCUMENTS

| | | |
|---|---|---|
| WO | WO0230125 | 4/2002 |
| WO | WO0245372 | 6/2002 |

OTHER PUBLICATIONS

"Impact of Flow Control on quality of service driven packet scheduling disciplines" Proceedings of the 1999 IEEE International Conference on Control Applications Kohala Coast HI Aug. 22, 1999; pp. 1454-1459.

"Application performance pitfalls and TCP's Nagle algorithm" vol. 27 No. 4 Mar. 2000 pp. 36-44.

"RTP: A Transport Protocol for Real-Time Applications" Network Working Group Request for Comments: 3550 Jul. 2003 pp. 1-104.

"TAPI 3.0 Connection and Media Services" Microsoft Windows 2000 Server Copyright 1999 pp. 1-23.

"A Mathematical Theory of Communication" reprinted with corrections from The Bell System Technical Journal vol. 27 pp. 379-423 623-656 Jul. Oct. 1948 (pp. renumbered as 1-55).

"Advanced Systems Format (ASF) Specification" Revision 01.20.01e Microsoft Corporation Sep. 2003 pp. i-vi and 1-93.

"Measuring Bandwidth" INFOCOM '99; Eighteenth Annual Joint Conference of the IEEE Computer and Communications Societies Proceedings; IEEE New York NY USA Mar. 21, 1999 pp. 235-245.

"SDP: Session Description Protocol" Network Working Group Request for Comments: 2327 The Internet Society Apr. 1998 pp. 1-42.

"Grouping of Media Lines in the Session Description Protocol (SDP)" Network Working Group Requests for Comments: 3388 The Internet Society Dec. 2002 pp. 1-21.

"WAVE and AVI Codec Registries" Network Working Group Request for Comments: 2361 The Internet Society Jun. 1998 pp. 1-71.

"Multicast for Small Conferences" Proceedings of the Sixth IEEE Symposium on Computers and Communications Jul. 3, 2001 pp. 145-150.

"An Architecture for Seamless Acess to Multicast Content" Proceddings of the 26th Annual IEEE Conference of Local Computer Networks Nov. 8, 2000 pp. 488-494.

"Streaming Media Congestion Control Using Bandwidth Estimation" Lecture Notes in Computer Science 2002 vol. 2496 pp. 89-100.

"Performance considerations for TCP/IP in wide area networks" Proceedings 19th Conference on Oct. 2-5, 1994 pp. 166-175.

"How a large ATM MTU causes deadlocks in TCP data transfers" IEEE/ACM Transactions on Networking vol. 3 Issue 4 Aug. 1995 pp. 409-422.

"The Research Interests of Mike Muuss"; Oct. 8, 1999; retreived from the Internet Archive at: http://web.archive.org/web/1991008020453/ftp.arl.mil/mike/.

"The Story of the PING Program"; Oct. 18, 1999: retrieved from the Internet Archive at : http://web.archive.org/web/19991018225218/ftp.arl.mil/mike/ping.html.

"RCache: Design and Analysis of Scalable Fault Tolerant Multimedia Stream Caching Schemes" Scalability and Traffic Control in IP Networks Proceedings of SPIE vol. 4526 pp. 68-86.

"A Caching and Straming Framework for Multimedia" ACM Multimedia 2000 Los Angeles CA; pp. 13-20.

Coulson, "A Distributed Object Platform Infrastructure for Multimedia Applications," Computer Communications, Jul. 1998, 27 pages, vol. 21, No. 9.

Nagle, "Congestion Control in IP/TCP Internetworks," RFC 896, Jan. 6, 1984, 8 pages.

Stevens, "TCP Slow Start, Congestion Avoidance, Fast Retransmit, and Fast Recovery Algorithms," RFC, Jan. 1997, 6 pages.

From the Internet: http://www.freesoft.org/CIE/Topics/83.htm, "TCP Protocol Overview," Connected: An Internet Encyclopedia, retrieved on May 31, 2000.

From the Internet: http://www.scit.wiv.ac.uk/~jphb/comms/tcp.html, "Transmission Control Protocol," retrieved on May 31, 2000.

Kamiyama, Noriaki "An Efficient Transmission Protocol for Multicast Video-on-Demand System", Technical Report of IEICE (the Institute of Electronics, Information and Communication Engineers), Japan, The Institute of Electronics, Information and Communication Engineers, Mar. 2001, vol. 100, No. 672, pp. 121-128.

Kawachiya, et al., "Videoproxy: A Media and Protocol Converter for Internet Video", Global Information Infrastructure (GII) Evolution: Interworking Issues. Interworking '96. Third International Symposium on Interworking. Nara (Japan), Oct. 1-3, 1996, Amsterdam, IOS, NL, Oct. 1, 1999 pp. 541-550.

Quicktime: "Quicktime Streaming Server Mondules", retrieved from the internet <URL:http://netmedia.kjist.ac.kr/courses/dic1698-2002sp/reports/QTSS.pdf> pp. 85-87, Quicktime, Feb. 2002 pp. 1-194.

"Accelerating Internet Streaming Media Delivery using Network-Aware Partial Caching" 2002 IEEE pp. 153-160.

"Hypertext Transfer Protocol—HTTP/1.1" Network Working Group Request for Comments: 2616; The Internet Society (Jun. 1999); Category: Standards Track pp. 1-176.

"Real Time Streaming Protocol (RTSP)" Network Working Group Request for Comments: 2326; The Internet Society (Apr. 1998) pp. 1-92.

Microsoft Computer Dictionary 5th Edition.

Kamiyama N et al. "Renegotiated CBR transmission in interactive video-on-demand system", Multimedia Computing and Systems '97 Proceedings, IEEE International Conference, Ottawa ONT, Canada Jun. 3-6, 1997, pp. 12-19.

Petit G H et al. "Bandwidth resource optimization in ivdeo-on-demand network architectures", Community Networkign Integrated Multimedia Services to the Home, 1994, Proceedings of the 1st International Workshop on San Francisco, CA Jul. 13-14, 1994, pp. 91-97.

Dutta A et al. "A Streaming architecture for next generation internet", ICC 2001, 2001 IEEE International Conference on Communications, Helsinky, Finland, Jun. 11-14, 2001, 1303-1309.

Lixin Gao et al. "Supplying instantaneous video-on-demand services using controlled multicast", Multimedia Computing and Systems, 1999, IEEE International Conference on Florence, Italy Jun. 7,11, 1999, pp. 117-121.

Dey, et al., "Playback Restart in Interactive Streaming Video Applications", IEEE, 1997, pp. 458-465.

* cited by examiner

CLIENT-SIDE CACHING OF STREAMING MEDIA CONTENT

RELATED APPLICATIONS

This application is a divisional application of U.S. patent application Ser. No. 10/179,770, filed Jun. 24, 2002, which is hereby incorporated by reference herein.

TECHNICAL FIELD

This invention relates to streaming media; and particularly to client-side caching of streaming media content.

BACKGROUND

Content streaming, such as the streaming of audio, video, and/or text media content is becoming increasingly popular. The term "streaming" is typically used to indicate that the data representing the media is provided over a network to a client computer and the client computer renders the streaming content as it is received from a network server, rather than waiting for an entire "file" to be delivered.

The increasing availability of streaming media content enables a variety of informational content that was not previously available over the Internet or other computer networks. Live content is one significant example of such content. Using streaming media content, audio, video, or audio/visual coverage of noteworthy events can be broadcast over the Internet as the events unfold. Similarly, television and radio stations can transmit their live content over the Internet.

Currently, streaming media content is streamed using the concept of "just in time delivery". The content is delivered to the client at the content's encoded bit rate for playback on the client. Some buffering of the streaming media content does occur (e.g., to allow for lost data that needs to be retransmitted and other network inconsistencies). However, current client systems typically attempt to minimize the amount of buffering performed on the client, thereby reducing the memory requirements on the client as well as reducing the startup latency due to buffering.

However, current streaming media content and buffering systems suffer from not having functionality that other types of content playback systems have. For example, a television program recorded on a VCR can be rewound by the user and previously viewed portions readily watched repeatedly, or watched at a later time as the user desires. Current streaming media content scenarios, however, do not allow such actions to be performed by the user. Rather, rewinding streaming media content would involve stopping and re-starting the streaming of the content at a new location (and thus re-buffering the stream starting at the new location), and a user typically cannot watch streaming media content at a later time—the content is played for the user as it is received and if the user desires to watch the content at the later time he or she must have the content streamed to him or her at that later time.

The client-side caching of streaming media content described below solves these and other problems.

SUMMARY

Client-side caching of streaming media content is described herein.

In accordance with certain embodiments, streaming media content can be streamed at a rate independent of the encoded bit rate of the content.

In accordance with other embodiments, streaming of streaming media content can continue even when the user has selected various shuttle control options (e.g., pause, stop, fast forward, seek, rewind, etc.).

In accordance with still other embodiments, streaming media content can be recorded for playback at a later time.

In accordance with yet other embodiments, streaming media content can be time-shifted.

In accordance with additional embodiments, streaming media content received from a server device is cached on a client device. Subsequent requests for the streaming media content at the client device can then be satisfied using the cached streaming media content rather than re-streaming the streaming media content from the server device.

BRIEF DESCRIPTION OF THE DRAWINGS

The same numbers are used throughout the document to reference like components and/or features.

DETAILED DESCRIPTION

Client-side caching of streaming media content is described herein. By caching the streaming media content, a variety of previously unavailable functionality can be made available to users. Examples of such functionality include: streaming media content at a rate independent of the encoded bit rate of the content, allowing streaming of content to continue even when the user has selected various shuttle control options (e.g., pause, stop, fast forward, seek, rewind, etc.), allowing streaming content to be recorded for playback at a later time, and allowing streaming content to be time-shifted. Different embodiments of the client-side caching of streaming media content can include different ones of these functionalities or combinations of different ones of these functionalities.

Figure 1:
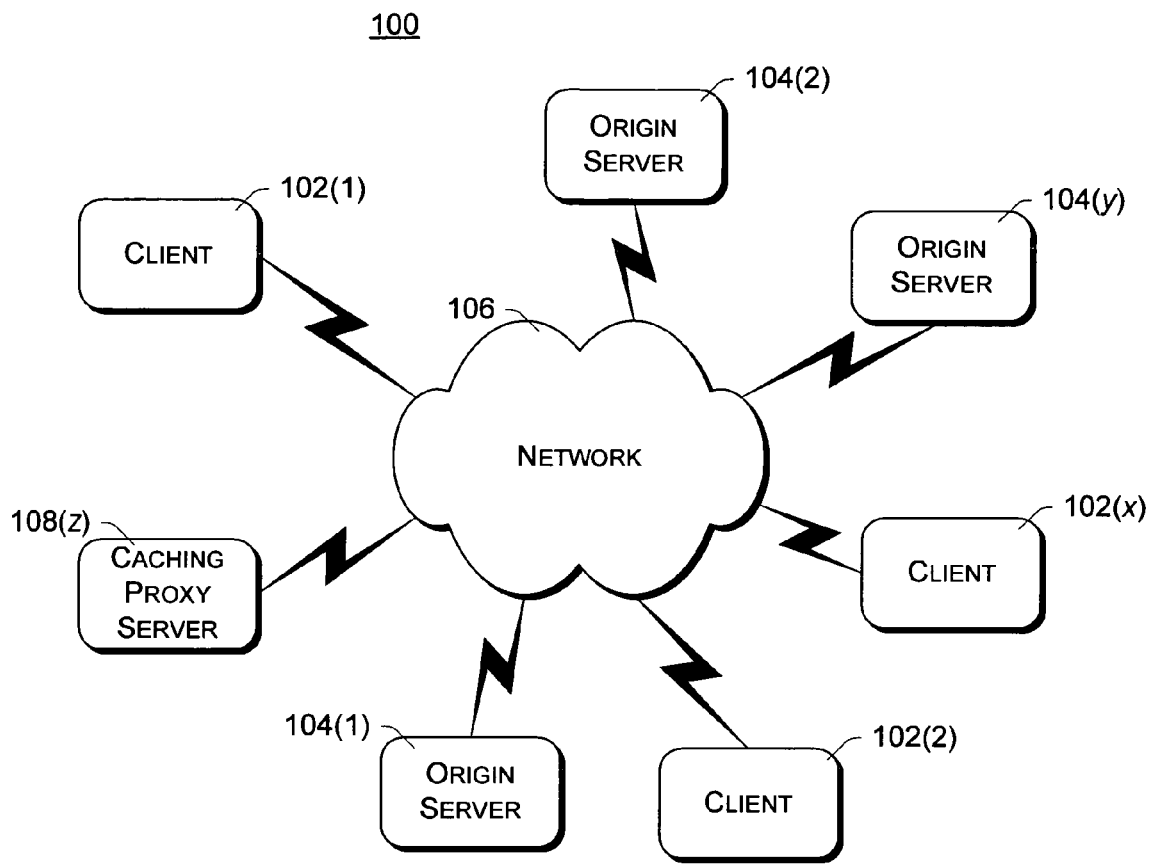
FIG. 1 illustrates an exemplary network environment in which client-side is caching of streaming media content can be employed.

FIG. 1 illustrates an exemplary network environment 100 in which client-side caching of streaming media content can be employed. In environment 100, multiple (x) client computing devices 102(1), 102(2), . . . , 102(x) are coupled to multiple (y) origin server computing devices 104(1), 104(2), . . . , 104(y) via a network 106. Network 106 is intended to represent any of a variety of conventional network topologies and types (including optical, wired and/or wireless networks), employing any of a variety of conventional network protocols (including public and/or proprietary protocols). Network 106 may include, for example, the Internet as well as possibly at least portions of one or more local area networks (LANs) and/or wide area networks (WANs).

When requesting streaming media content that is available from an origin server device 104, the request is routed from client device 102 to the server device 104 via network 106. The origin server device 104 receives the request and returns the requested content to the requesting client device 102 via network 106. One or more proxy servers (not shown) may be part of network 106, and requests from client device 102 and responses to client device 102 may be sent to and received from such a proxy server(s) rather than the actual server device 104. Whatever device (whether it be an origin server, proxy server, or other device) is streaming media content to a client device 102 is referred to as the source device for that streaming media content.

Computing devices 102 and 104 can each be any of a variety of conventional computing devices, including desktop PCs, notebook or portable computers, workstations, mainframe computers, Internet appliances, gaming consoles, handheld PCs, cellular telephones, personal digital assistants (PDAs), combinations thereof, etc. One or more of devices 102 and 104 can be the same types of devices, or alternatively different types of devices.

Server devices 104 can make any of a variety of data available for streaming to clients 102. The term "streaming" is used to indicate that the data representing the media is provided over a network to a client device and that playback of the content can begin prior to the content being delivered in its entirety. The data may be publicly available or alternatively restricted (e.g., restricted to only certain users, available only if the appropriate fee is paid, etc.). The data may be any of a variety of one or more types of content, such as audio, video, text, animation, etc. Additionally, the data may be "on-demand" (e.g., pre-recorded and of a known size) or alternatively "broadcast" (e.g., having no known size, such as a digital representation of a concert being captured as the concert is performed and made available for streaming shortly after capture).

Figure 2:
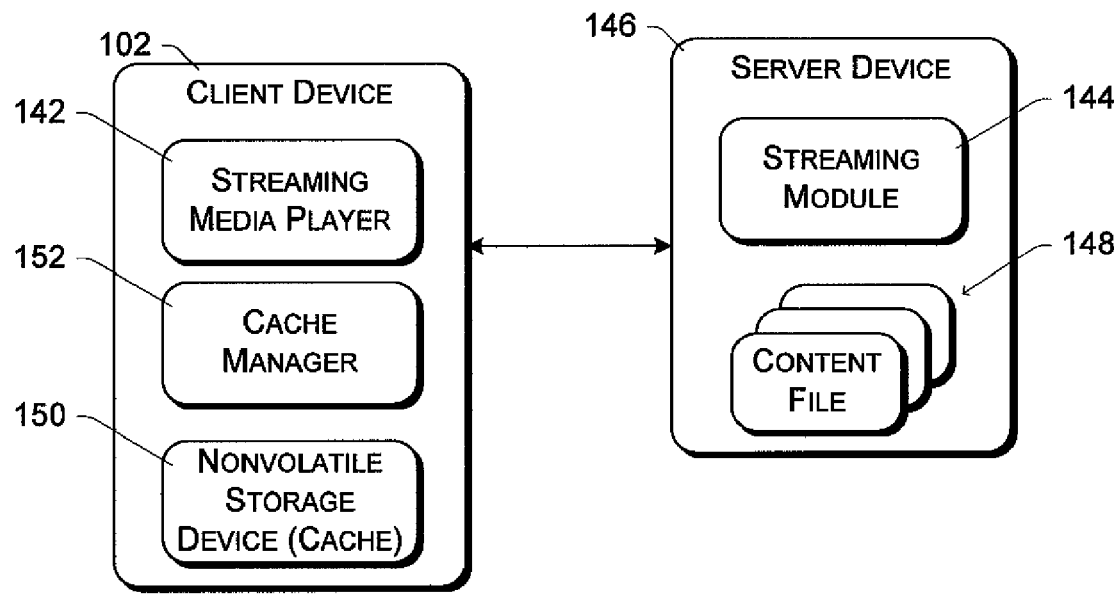
FIG. 2 illustrates exemplary client and server devices.

FIG. 2 illustrates exemplary client and server devices. Client device 102 includes a streaming media player 142 configured to access a streaming module 144 of a source server device 146. Source server device 146 may be, for example, an origin server device 104 of FIG. 1, or alternatively another device (e.g., a proxy device). Source server device 146 also includes one or more streaming media content files 148 from which a selection can be made by media player 142 (e.g., based on user input at player 142) and the selected content file streamed to player 142. Once received, the streaming media content can be cached at client device 102 by saving the content to a nonvolatile storage device 150. Although not shown in FIG. 2, one or more additional devices (e.g., firewalls, routers, gateways, bridges, multiple proxy servers, etc.) may be situated between client device 102 and server device 146. It should be noted that multiple clients 102 may access server 146 and that a single client 102 may access multiple servers 146, although only a single client 102 and server 146 have been shown in FIG. 2 for ease of explanation.

Nonvolatile storage device 150 is nonvolatile in that it maintains its state even in the event of a power failure. Thus, streaming media content saved to nonvolatile storage device 150 persists in the event of power loss to client 102 (e.g., in the event client 102 is turned off). A variety of different nonvolatile storage types may be used as device 150, such as a magnetic disk and disk drive (e.g., a conventional hard disk), an optical disk and disk drive, Flash memory, and so forth.

Communication between devices 102 and 146 can occur using a variety of different conventional protocols. In one implementation, communication between devices 102 and 146 occurs using a version of the HyperText Transport Protocol (HTTP), such as version 1.1 (HTTP 1.1). In another implementation, communication between devices 102 and 146 occurs using the Real Time Streaming Protocol (RTSP). Alternatively, other protocols may be used, such as the Session Initiation Protocol (SIP), the Simple Object Access Protocol (SOAP), and so forth.

Additionally, streaming media content can be stored and streamed in accordance with any of a variety of different streaming media formats. In one exemplary implementation, media is streamed in accordance with the ASF format (Advanced Systems Format or Advanced Streaming Format). Additional information regarding ASF is available from Microsoft® Corporation of Redmond, Wash. The same technique can be applied to other formats as well, such as MPEG (Moving Pictures Experts Group)-1, MPEG-2, MPEG-4, Quicktime, etc.

Figure 3:
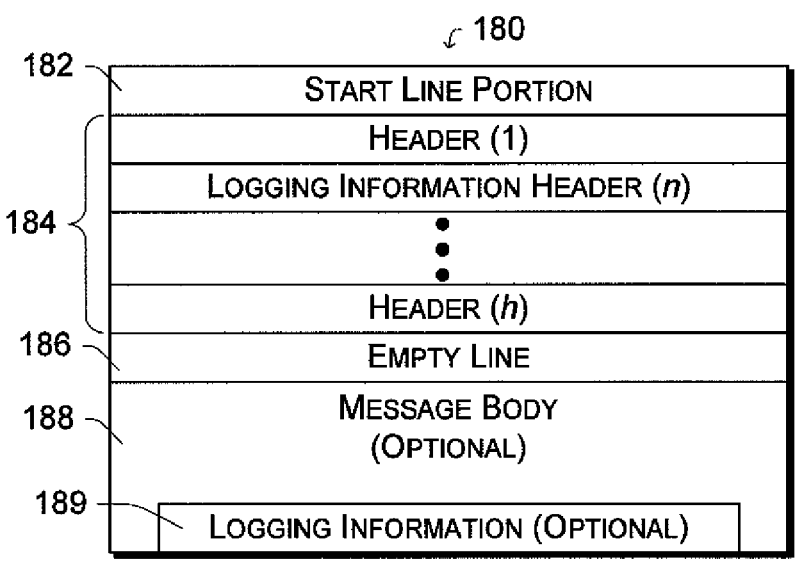
FIG. 3 illustrates an exemplary message format that can be used in communicating streaming media data.

FIG. 3 illustrates an exemplary message format that can be used in communicating streaming media data. The data structure 180 of a message, such as an HTTP 1.1 message or RTSP message, includes a start line field or portion 182, one or more header fields or portions 184, an empty line field or portion 186, and an optional message body field or portion 188. Start line portion 182 contains data identifying the message or data structure type, which can be either a request-line (e.g., for an HTTP 1.1 GET request or an RTSP GET_PARAMETER request) or a status-line (e.g., for an HTTP 1.1 200 OK response or an RTSP 1.0 200 OK response). One or more headers 184 are also included that contain data representing information about the message. The one or more headers optionally includes a logging information header. An empty line portion 186 is used to identify the end of the headers 184. Additional data may optionally be included in message body portion 188 such as logging information 189. In the discussions herein, various directives are included as headers 184, although these directives may alternatively be situated in message body 188.

Control information (e.g., for setting up the streaming of media content) as well as data (e.g., the streaming media content) is communicated between devices 102 and 146 of FIG. 2 as appropriate using messages with data structure 180. These messages thus correspond to or are associated with the media content being streamed.

Returning to FIG. 2, cache manager 152 of client device 102 manages the caching of streaming media content received by streaming media player 142 from origin server 146. Streaming media player 142 receives the content and, when it determines it should cache the content, forwards the content to cache manager 152 for storage. Streaming media player 142 may make the determination on its own, or alternatively based at least in part on information received from cache manager 152 (e.g., whether there is space available in the cache).

It should be noted that the caching of streaming media content by streaming media player 142 is different than buffering the streaming media content. Various differences between caching and buffering exist, typically including one or more of the following: the cached content is stored to a nonvolatile storage device rather than a volatile memory; the cached content can include content that has already been played back; and the cached content can include content that is not to be played back for a long time, rather than immediately (e.g., as with "just in time" delivery).

Different pieces of streaming media content are illustrated as different files 148 in FIG. 2, although alternatively a piece of streaming media content may be stored as multiple files (or, in the case of broadcast content, as no file). The manner in which a "piece" of content is defined can vary by implementation and based on the type of media. For example, for musical audio and/or video content each song can be a piece of content. Content may be separated into pieces along natural boundaries (e.g., different songs), or alternatively in other arbitrary manners (e.g., every five minutes of content is a piece).

Conventional components that are part of client device 102 can optionally be leveraged to perform the cache management functionality. In one exemplary implementation, the Microsoft® Internet Explorer browser program includes cache management functionality, and streaming media player 142 leverages and uses this functionality.

Each piece of media content may include multiple streams, even though they may be stored together as a single file. Each such stream represents a particular type of media (e.g., audio, video, text, etc.), typically at a particular encoded bit rate. The encoded bit rate is the rate at which the media content is encoded for playback. It should be noted that the encoded bit rate is independent of the user-perceived playback speed of the content (for example, both a normal stream of content and a fast forward stream of content which the user perceives as two times the playback speed of the normal stream typically have the same encoded bit rate).

Multiple versions of the same type of media (e.g., multiple audio versions, multiple video versions, etc.) may be included in the media content, allowing selection of different combinations of these streams for playback by media player 142. Each of these different versions is typically encoded at a different bit rate (with higher bit rates typically resulting in higher quality content). Which combination of streams are to be included in the streaming media content can be selected in a variety of manners, such as user preferences (e.g., for higher or lower quality content), available network bandwidth, a desired bit rate for particular content (e.g., a bit rate set by the content author or distributor and included in the identifier of the streaming media content so that, when the identifier is selected by the user, streaming media player 142 selects streams (optionally based on user preferences) that are as close as possible to the desired bit rate).

When caching content, cache manager 152 stores in non-volatile storage device 150 the particular streams (as requested by streaming media player 142) received from server device 146 as the streaming media content. Different stream combinations for the same piece of media content can be cached by cache manager 152. Alternatively, cache manager 152 may obtain all the streams for particular media content from server device 146 and cache all of the streams, but playback only the requested streams to media player 142.

Multiple pieces of content may also be grouped together in a play list, which is a list of one or more items each of which is a particular piece of content to be streamed. These different pieces of content can be selected (e.g., by the user or by some other party) to be grouped together in a play list, allowing a user to select all of them for rendering simply by selecting the play list. By way of example, a user may select twenty of his or her favorite songs to be part of a play list, and subsequently have those songs played back to him or her by selecting playback of the play list.

Caching of streaming media content at client 102 allows streaming media player 142 to provide various functionality and thus enhancements to the user experience. These include: streaming media content at a rate independent of the encoded bit rate of the content; allowing streaming of content to continue even when the user has selected various shuttle control options (e.g., pause, stop, fast forward, seek, rewind, etc.); allowing streaming content to be recorded for playback at a later time; and allowing streaming content to be time-shifted.

Caching streaming media content at client 102 allows media content to be streamed from server device 146 to client device 102 at a rate independent of the encoded bit rate. Although some situations may arise where the streaming rate is the same as the encoded bit rate, the streaming rate can be greater than or less than the encoded bit rate. Streaming media content received by streaming media player 142 is stored in the cache and, when playing back the content, media player 142 retrieves the content from the cache for playback while at the same time continuing to cache subsequent parts of the content being streamed from server device 146. In one exemplary situation where the streaming rate is less than the encoded bit rate, media player 142 imposes additional delays in playback of the streamed content based on how much of the content has been cached, what the encoded bit rate is, and what the streaming rate is. For example, if the encoded bit rate is 300 kbps, and the streaming rate is 150 kbps, then media player 142 delays beginning playback of the content until sufficient content has been stored so that the content can be played through from beginning to end without any user-noticeable pauses.

In one implementation, media player 142, when requesting the streaming content from streaming module 144, also communicates a speed request to streaming module 144. This speed request indicates the rate at which media player 142 would like the media content streamed. Streaming module 144 may then accept the requested rate and proceed with streaming the media content to media player 142 at the requested rate, or alternatively change the rate. For example, streaming module 144 may not be able to stream the content at the requested rate (e.g., due to server policies, hardware and/or software limitations of the server, the current load of the server, and so forth). Streaming module 144 sends an indication to media player 142 of what the streaming rate will be (alternatively, the streaming rate may be the rate requested by media player 142 unless streaming module 144 indicates otherwise). Additionally, streaming module 144 can attempt to change the streaming rate during streaming of the content (by sending a new speed request to streaming module 144), and streaming module 144 may change the streaming rate during streaming of the content (by sending a new speed indication to media player 142).

Media player 142 can determine the streaming rate it desires, and thus the rate it requests from streaming module 144, based on a variety of different factors. The determination can be made on a content-by-content basis. In one implementation, media player 142 attempts to determine the current available bandwidth between media player 142 and streaming module 144. This can be determined in any of a variety of conventional manners, such as sending test messages between devices 102 and 146, monitoring current and past behavior of connections between device 102 and 146, receiving an indication of the available bandwidth from streaming module 144, and so forth. Given the current available bandwidth, media player 142 initially requests a streaming rate that is a particular amount less than the current available bandwidth. This particular amount can be fixed (e.g., always 50 kbps) or dynamic (e.g., 15% of the current available bandwidth, or between 5% and 25% of the current available bandwidth).

The streaming speed request sent from media player 142 to streaming module 144 can indicate the rate at which media player 142 would like the data streamed in any of a variety of manners. In one implementation, the rate is indicated by a speed factor relative to the encoded bit rate of the content (e.g., a speed factor of 3.2 indicates that the streaming rate is 3.2 times faster than the encoded bit rate of the content, while a speed factor of 0.5 indicates that the streaming rate is one-half the encoded bit rate of the content). In another implementation, the rate is indicated by simply stating the desired streaming bit rate (e.g., 300 kbps, 500 kbps, 20 kbps, etc.).

The speed request indication can be sent from media player 142 to streaming module 144 in a variety of different manners. In one implementation, where communication between devices 102 and 146 occurs using RTSP, the following RTSP header is added to a message (e.g., as a header 184 of FIG. 3) sent from streaming media player 142 to streaming module 144:

Speed: x where x represents the requested speed factor relative to the encoded bit rate of the content. The value x can be an integer or a real number (the number of decimal places may optionally be limited—typically to one or two decimal places although other values can be used). This header can be added to different messages, and in one implementation is included in a message sent from streaming media player 142 to streaming module 144 requesting streaming of the media content.

When streaming module 144 responds to the request, streaming module 144 returns an analogous header (Speed: y) in an RTSP PLAY response message to streaming media player 142, where y represents the speed (relative to the encoded bit rate of the content) at which streaming module 144 will be streaming the requested content (and may or may not be the same as the value x). As with the value x, the value y can be an integer or a real number (and the number of decimal places may optionally be limited—typically to one or two decimal places although other values can be used).

In another implementation, where communication between devices 102 and 146 occurs using HTTP, the following HTTP header is added to a message (e.g., as a header 184 of FIG. 3) sent from streaming media player 142 to streaming module 144:

Pragma: Speed=x where x represents the requested speed factor relative to the encoded bit rate of the content. The Pragma header is a general-header field used in HTTP to include implementation specific directives. Analogous to the RTSP Speed header discussed above, this header can be added to different messages, and in one implementation is included in a message sent from streaming media player 142 to streaming module 144 requesting streaming of the media content.

When streaming module 144 responds to the request, streaming module 144 returns an analogous header (Pragma: Speed=y) in an HTTP GET response message to streaming media player 142, where y represents the speed (relative to the encoded bit rate of the content) at which streaming module 144 will be streaming the requested content (and may or may not be the same as the value x). As with the value x, the value y can be an integer or a real number (and the number of decimal places may optionally be limited—typically to one or two decimal places although other values can be used).

It should be noted that, although the streaming rate for the content may be identified with reference to the encoded bit rate, this is done simply because it is an easy point of reference. The streaming rate is still independent of the encoded bit rate—virtually any speed factor can be requested and/or selected, and the way that speed factor is identified is with reference to the encoded bit rate.

Figure 4:
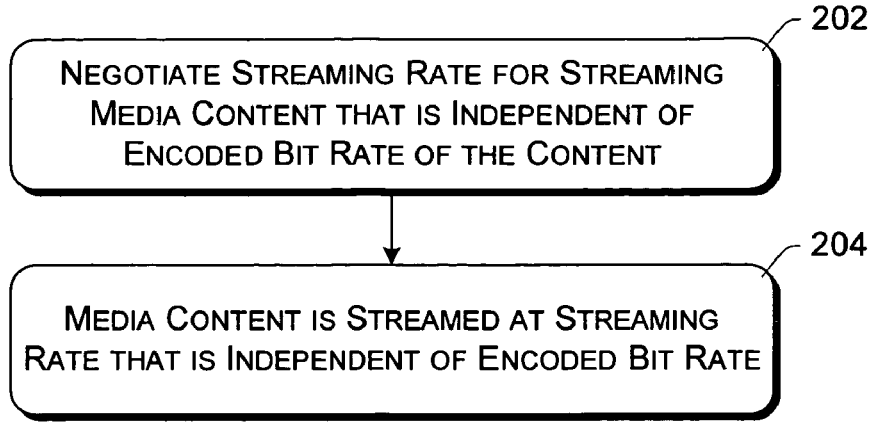
FIG. 4 is a flowchart illustrating an exemplary process for streaming media content from a server to a client.

FIG. 4 is a flowchart illustrating an exemplary process 200 for streaming media content from a server to a client. Process 200 is implemented by a client device and server device, such as devices 102 and 146 of FIG. 2, and may be performed in software, firmware, hardware, or combinations thereof.

Initially, a streaming rate for streaming media content that is independent of the encoded bit rate of the content is negotiated between the client and server devices (act 202). This negotiation can be, for example, the submission of a requested speed by the client and a return indication of the streaming speed as discussed above. Alternatively, the negotiation may take other forms, such as being initiated by the server device (or some other device) and the client device requesting any desired changes to the streaming rate; using a default rate that can be changed by the client device or the server device; using a rate indicated by the streaming media content identifier and that can be changed by the client device or the server device; and so forth. Once the streaming rate is negotiated, the media content is streamed from the server device to the client device at the negotiated streaming rate (act 204). The streaming rate can optionally be subsequently re-negotiated (initiated by the client device, server device, or some other device) during streaming of the content.

Returning to FIG. 2, streaming module 144 typically does not transfer an entire content file 148 to streaming media player 142 as the streaming media content. Certain information, such as file headers and indexing information, is typically not transferred to streaming media player 142 as part of the streaming media content. The exact nature of this information can vary, based on the manner in which streaming module 144 is designed and the format used to stream the media content. When such information is not transferred to client device 102, streaming media player 142 (or alternatively cache manager 152) generates the information and adds the information to cache 150. Thus, the appropriate information is available as part of the cached content and can be used by streaming media player 142 when playing back the streaming media content from the cache.

When streaming media player 142 receives a request for playback of streaming media content, streaming media player 142 checks, via cache manager 152, whether the requested content is available in cache 150. If the content is available in cache 150 (referred to as a "cache hit"), then streaming media player 142 obtains the requested streaming media content from cache 150 rather than from server device 146. However, if the content is not available in cache 150 (referred to as a "cache miss"), then streaming media player 142 obtains the requested streaming media content from server device 146. It should be noted that, in the event the cache becomes full and no longer has sufficient storage space for additional streaming media content, previously cached content can be deleted from the cache (often referred to as being evicted from the cache) in order to make space for new content. Any of a variety of conventional cache replacement algorithms can be used to determine which content is evicted from the cache.

In some situations, a content file 148 may include multiple different streams having different encoded bit rates (e.g., a low quality stream encoded at 56 kbps, and a high quality stream encoded at 300 kbps). Such files are often referred to as multiple bit rate files. In these situations, typically only a single stream (e.g., the low quality stream or the high quality stream) is streamed to client device 102, and that is the stream that is cached in cache 150. Subsequent requests for the same content at the same encoded bit rate can be satisfied from cache 150 (they result in a cache hit), but requests for another encoded bit rate cannot be satisfied from cache 150 (they result in a cache miss). Alternatively, streaming media player 142 may have all of the encoded bit rates streamed from streaming module 144, thus having all of them stored in cache 150.

Streaming module 144 may optionally include an expiration time for streaming media content. This expiration time may be a relative time (e.g., five minutes after the content has been sent) or a fixed time (e.g., a particular date and time). The expiration time for streaming media content can be indicated in a variety of different manners. In one implementation, the expiration time is indicated using the HTTP max-age cache control directive. In another implementation, the expiration time is indicated using the HTTP or RTSP Expires header.

Once expired, streaming media player 142 revalidates the content prior to playing back the content from the cache. Typically, this revalidation occurs when a request for the content is received at streaming media player 142 (e.g., a user request for playback of the content), or alternatively it may occur at other times (e.g., streaming media player 142 or cache manager 152 may monitor the cache and detect when the expiration time has passed regardless of whether the content is being requested). When content expires, the streaming media player 142 retrieves new information describing the content (so streaming media player 142 can determine whether the content has changed) and a new expiration time.

If the content has not changed, then streaming media player 142 can simply update the expiration date for the content to the new expiration date—no changes to the cached content need be made. However, if the content has changed, then streaming media player 142 streams the requested content from streaming module 144 rather than obtaining the content from the cache. Alternatively, streaming media player 142 may attempt to determine what has been changed with the content and stream only the portion(s) that have been changed from streaming module 144, obtaining the remaining portions from the cache.

Streaming media player 142 can obtain information describing particular content available from server device 146 using a describe operation. In response to a describe request, streaming module 144 returns various information describing the identified media content, such as header information (e.g., including bibliographic information about the content, characteristics of the stream(s) of the content, information necessary to regenerate an index for the content, etc.), meta data associated with the content, a list of streams available as part of the content, and so forth. The exact information returned can vary based on the manner in which streaming module 144 is implemented and the particular format used to stream the media content. This information can be used to revalidate the content.

In one implementation, the header information for a particular content stream includes a GUID (Globally Unique ID) value that is changed by the content author whenever the content is changed. This value is known as the "MMS Type" attribute. Changes to the content can be detected by checking this GUID value—if the value has not changed then the content has not changed, and if the GUID value has changed then the content has changed.

Alternatively, different information can be checked to determine whether the content has changed. In one implementation, the content description information includes an indication of the last modified date (e.g., this may be a header 184 of FIG. 3). If the newly received last modified date is different than the previously received last modified date, then streaming media player 142 determines that the content has been changed. Other information that may be checked is a hash of the content. A hash value of the content may be generated using any of a variety of conventional hashing algorithms—changes to the content generally result in a change in the hash value of the content. If the hash value has changed, then streaming media player 142 determines that the content has been changed.

As discussed above, the streaming media content may be a play list of multiple pieces of content. When a play list of media content is cached, streaming media player 142 revalidates each piece of media content in the play list as necessary. Those pieces that have changed since being cached are streamed from streaming module 144 rather than obtained from the cache. Additionally, situations may arise where not all of the pieces of media content in the play list have been cached at client device 102. In these situations, those pieces that have not been cached are streamed from streaming module 144 rather than obtained from the cache.

Additionally, with play lists, situations can arise where streaming media player 142 indicates to streaming module 144 that the player is ready for the next piece of content in the play list. This indicating can be accomplished by communicating a "stream next entry" command to streaming module 144, or alternatively by simply having the current piece of content streamed from streaming module 144 even though the piece can be obtained from the cache (when streaming module 144 reaches the end of the current piece of content, it knows it is time to begin streaming the next piece of content).

Caching streaming media content also allows the streaming of content to continue even when the user has selected various shuttle control options (e.g., stop, pause, fast forward, seek, rewind, etc.). Streaming media player 142 makes shuttle control options available to the user of player 142, thereby allowing the user to control playback of the streaming module 144 as he or she desires. When the user enters a particular shuttle control command, the behavior of streaming media player 142 varies based on what command is entered. However, in many cases, streaming media player 142 continues streaming of the media content from streaming module 144.

If the user enters a stop command, then streaming media player 142 stops playback of the streaming media content but continues to stream and cache the content from streaming module 144. Similarly, if the user enters a pause command, then streaming media player 142 pauses playback of the streaming media content but continues to stream and cache the content from streaming module 144. Additionally, if the user enters a rewind command, then streaming media player 142 begins rewinding the streaming media content but continues to stream and cache the content from streaming module 144. Furthermore, if the user enters a fast forward command, then streaming media player 142 begins fast forwarding of the streaming media content through the already-cached portions of the content, and continues to stream and cache the content to the extent necessary.

Figure 5:
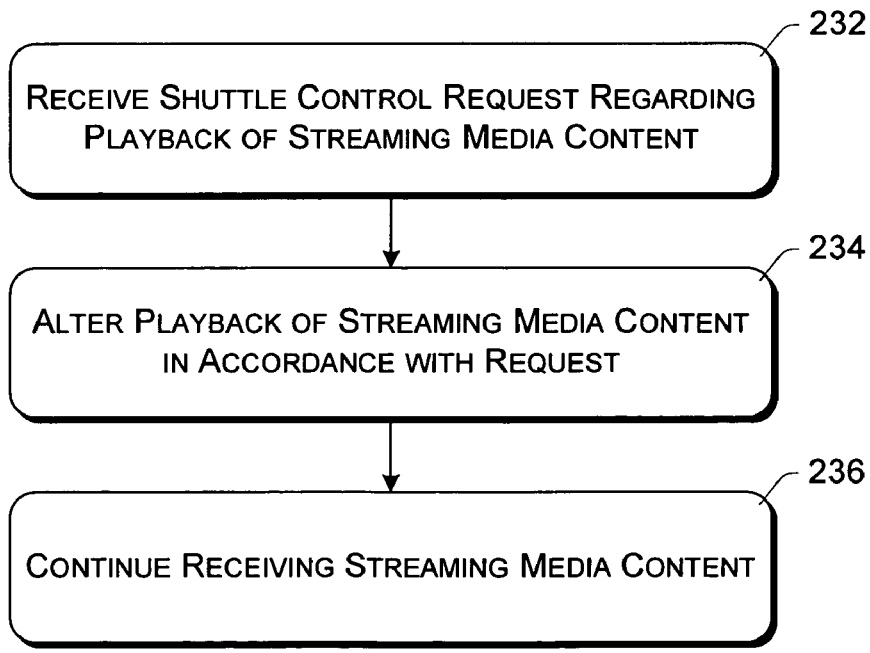
FIG. 5 is a flowchart illustrating an exemplary process for streaming media content from a server to a client while accepting shuttle control commands.

FIG. 5 is a flowchart illustrating an exemplary process 230 for streaming media content from a server to a client while accepting shuttle control commands. Process 230 is implemented by a streaming media player of a client device, such as streaming media player 142 of client device 102 of FIG. 2, and may be performed in software, firmware, hardware, or combinations thereof.

Initially, a shuttle control request regarding playback of streaming media content is received at the streaming media player (act 232). The streaming media player alters playback of the streaming media content in accordance with the request (act 234), but continues to receive the streaming media content (act 236). It should be noted that the streaming media player need not, and typically does not, inform the server device of the shuttle control command except with subsequent log submissions detailing the user actions.

Additionally, the user's ability to navigate or control playback of the streaming media content using shuttle control commands may be restricted for certain pieces of content (or portions of certain pieces). For example, a user may not be able to fast forward over a certain portion of streaming media content (e.g., an advertisement). Indications of such restrictions are received by streaming media player from streaming module 144, and cached along with the streaming media content. Thus, any such restrictions are also enforced when playing back the streaming media content from the cache.

Caching streaming media content further allows content to be recorded for playback at a later time. At least a portion of the content may be played back for the user while the content is being streamed and cached, or alternatively none of the content may be played back until a later time (e.g., sometime after caching of the content has been completed). For example, a user may input to streaming media player 142 a request to cache multiple pieces of streaming media content, and then playback those pieces at a later time (e.g., later that day, the next day, the next week, the next month, etc.). Such a request may be, for example, a specific "cache content" request, or alternatively simply a play request. When streaming media player 142 receives such a request, it communicates with streaming module 144 and has the requested content streamed in the same manner as if streaming media player 142 were playing back the content for the user. However, when the content is received at client device 102, streaming media player 142 caches the content to nonvolatile storage device 150 and does not (unless requested by the user) play back the content at the current time. When the user subsequently requests playback of the content, streaming media player 142 obtains the content from the cache (assuming the content has not expired or, if the content has expired then assuming the content has not been changed).

Caching streaming media content further allows for time-shifted playback of the streaming media content. With time-shifted playback, the user can navigate through and control the streaming content while it is being streamed (e.g., by entry of pause, rewind, fast forward, etc. commands). For example, a user may pause the playback of streaming media content at a particular location, then resume playback from that location several minutes later—even though additional content was streamed to client device 102 while the playback was paused, playback still resumes from the location where the user paused the playback. By way of another example, a user may rewind the streaming media content while it is being streamed in order to watch a portion of the content again (or multiple additional times). If the user rewinds the content, for example, by three minutes, the user can watch those three minutes again and then playback continues (with no user-noticeable break in the playback) from the point in the content where the user entered the rewind command, even though additional content was streamed to client device 102 while the three previous minutes of content were being played back again.

Figure 6:
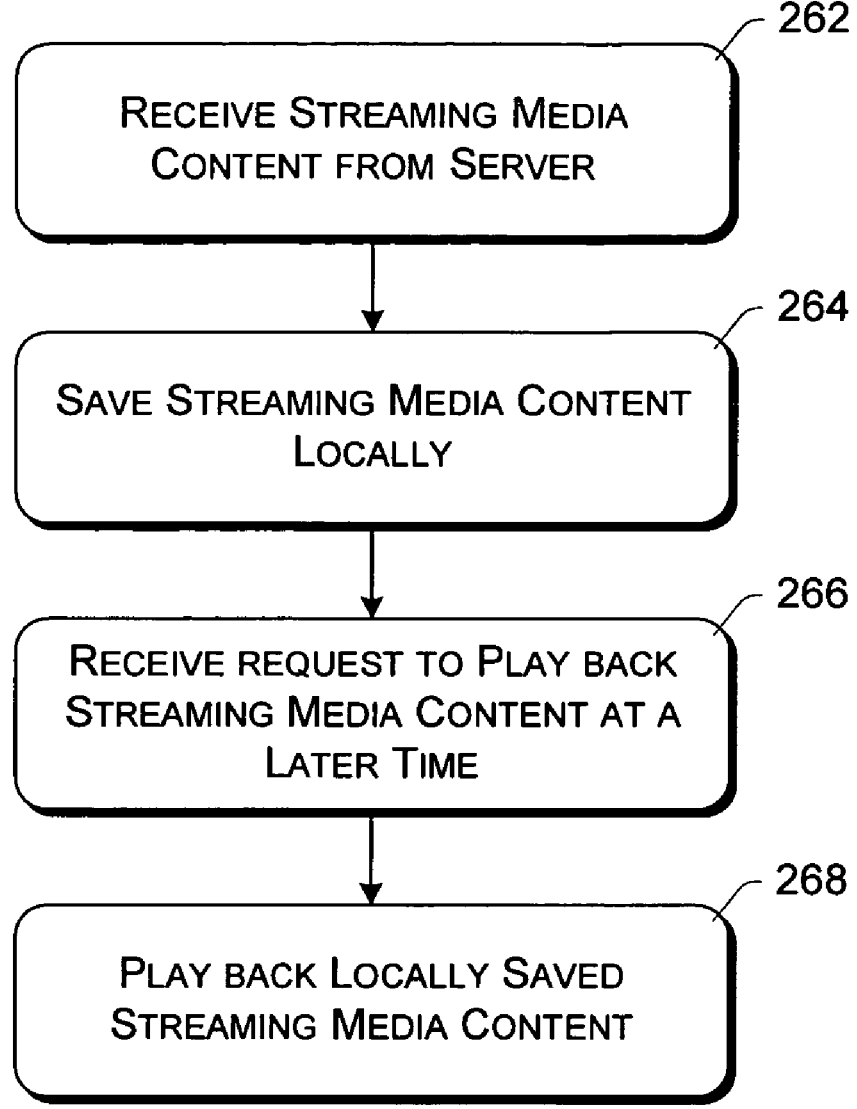
FIG. 6 is a flowchart illustrating an exemplary process for recording streaming media content for subsequent playback.

FIG. 6 is a flowchart illustrating an exemplary process 260 for recording streaming media content for subsequent playback. Process 260 is implemented by a streaming media player of a client device, such as streaming media player 142 of client device 102 of FIG. 2, and may be performed in software, firmware, hardware, or combinations thereof.

Initially, the streaming media content is received from the server (act 262). The received streaming media content is stored locally (act 264), in the cache of the client device. A request to play back the streaming media content is received at a later time (act 266), which may be after streaming of the media content has completed or not. In response to the playback request, the locally saved streaming media content is played back (act 268).

Additionally, various logging information is typically returned by streaming media player 142 to streaming module 144 when streaming media player 142 is playing back streaming media content. In situations where streaming media player 142 obtains the streaming media content from the cache at client device 102 rather than from streaming module 144, this logging information should still be returned to streaming module 144. The logging information can include a variety of information, such as the amount of time streaming media player 142 spent playing back the content, which portions of the content were played back multiple times, which portions of the content were skipped over, whether playback of the content was paused and if so at what point(s) in the content did the pausing occur, problems with the network connection via which the streaming content was received, and so forth.

The logging information can be communicated to server device 146 in a variety of different manners. In one implementation, a message is sent using the following header to indicate that the message body (e.g., body 188 of FIG. 3) includes logging information:

Content-Type: application/x-wms-sendevent although different headers could alternatively be sent. The message can be, for example, an RTSP SET_PARAMETER message or an HTTP POST message.

It should be noted that not all streaming media content may be cacheable at client device 102. Different situations may exist where streaming media content is not cached at client device 102. These situations include, for example, situations where the server device does not support caching, where the content author or distributor has indicated that particular content is not to be cached, where caching is disabled by the user of client device 102, and so forth. Additionally, in some embodiments certain content, such as broadcast content, is not to be cached (while in other embodiments broadcast content can be cached). If streaming media player 142 determines that a particular piece of content is not to be cached, then streaming media player 142 does not cache the content.

In one implementation, when streaming media player 142 requests content to be streamed from streaming module 144, streaming module 144 returns an indication of whether caching of the requested content is supported by streaming module 144. This indication can be included in a message header (e.g., a header 184 of FIG. 3) and is referred to as a "supported" header. An example of a directive in a supported header is as follows:

com.microsoft.wm.fastcache although other headers can alternatively be used. The presence of this supported header indicates that streaming module 144 supports caching of client device 102, so streaming module 144 allows, for example, media content to be streamed at a rate independent of the encoded bit rate, logging information to be received for cached content, etc. If this supported header is not present, then streaming media player 142 does not cache the streaming media content associated with the message.

Additionally, various cache-control directives can be used to control the caching of particular pieces of streaming media content. Cache control headers contain information describing how caching of the associated streaming media content is to be handled by cache manager 152 (as well as any intermediary devices, such as proxy servers, that include caches). The cache control header is used to specify directives that are to be obeyed by all caching mechanisms that receive the message. Although not discussed here, additional cache control directives (e.g., conventional HTTP or RTSP cache control directives) may also be included in the cache control header.

Depending on the protocol used, cache control directives to indicate that only a streaming media player can cache the associated content may or may not be included. For protocols that are designed for both streaming and non-streaming media (e.g., HTTP), the indication that a streaming media player (but not a generic HTTP component (e.g., a web browser) or proxy device) can cache the associated content is typically used. However, for protocols that are designed specifically for streaming media (e.g., RTSP), the indication that only a streaming media player can cache the associated content is not needed (and thus is typically not used).

Table I illustrates exemplary cache control directives and whether caching is allowed for protocols that are designed specifically for streaming media (e.g., RTSP). Table II illustrates exemplary cache control directives and whether caching is allowed for protocols that are not designed specifically for streaming media (e.g., HTTP).

TABLE I

| Cache Control Directive | Streaming Media Player Caching |
| --- | --- |
| <none> | Allowed |
| "no-user-cache" | Not Allowed |
| "no-cache" | Not Allowed |

TABLE II

| Cache Control Directive | Generic HTTP Cache/ Proxy device Caching | Streaming Media Player Caching |
| --- | --- | --- |
| <none> | Allowed | Allowed |
| "no-cache, user-public" | Not Allowed | Allowed |
| "no-cache" | Not Allowed | Not Allowed |

It should be noted that, in Table II, the "user-public" directive is understood by streaming media player 142 as indicating that the associated content can be cached, and overrides the "no-cache" directive. However, if the "user-public" directive is not included, then the "no-cache" directive indicates to streaming media player 142 that the associated content cannot be cached. Furthermore, a generic HTTP cache or proxy device does not understand the "user-public" directive, and thus simply follows the "no-cache" directive and will not cache the content.

Various other factors may also weigh in on determining whether to cache a particular piece of content. In one implementation, the streaming media content identifier, such as a URL (Uniform Resource Locator) may include an indication that the content is to be cached or is not to be cached. For example, the value "?WMCache=0" may be used to indicate that no caching of the content is to occur, while the value "?WMCache=1" may be used to indicate that caching of the content is to occur. In another implementation, streaming media player 142 allows the user to specifically disable client caching of streaming media content, in response to which no streaming media content will be cached by streaming media player 142. In yet another implementation, streaming media player 142 may decide not to cache any streaming media content (e.g., it may determine that there is not enough storage space for content caching, or it may determine that it has is played back content from its cache less than a threshold number of times so it will not cache subsequently received streaming media content, etc.). In still another implementation, only certain types of streaming media content may be cached (e.g., on-demand content is cacheable but broadcast content is not cacheable).

Additionally, if streaming media player 142 determines that a piece of streaming media content is going to be cached, various restrictions may optionally be placed on streaming media player due to that caching. For example, streaming media player 142 may be configured to not request stream thinning (e.g., reducing the number of frames being streamed from the server device in order to save bandwidth) if it is caching the content.

Figure 7:
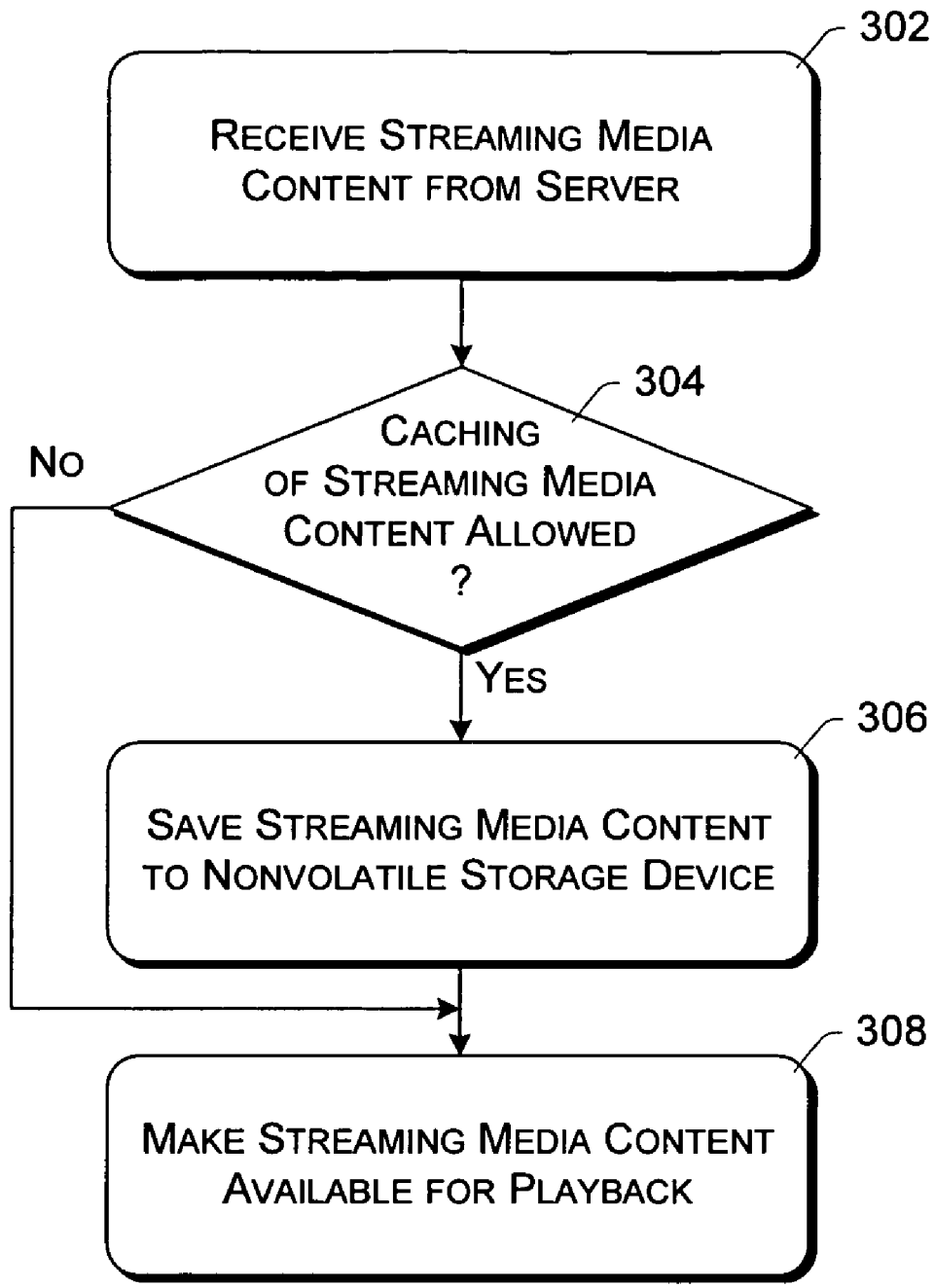
FIG. 7 is a flowchart illustrating an exemplary process for caching streaming media content on a client device.

FIG. 7 is a flowchart illustrating an exemplary process 300 for caching streaming media content on a client device. Process 300 is implemented by a streaming media player of a client device, such as streaming media player 142 of client device 102 of FIG. 2, and may be performed in software, firmware, hardware, or combinations thereof.

Initially, the streaming media content is received from the server device (act 302). Process 300 proceeds based on whether it is caching of the streaming media content is allowed (act 304). If caching is allowed, then the content is saved to a nonvolatile storage device (act 306), and the streaming media content is made available for playback (act 308). It should be noted that, in act 308, if the streaming media content is cached then it can be available for playback while the content is being streamed and/or at a later time. However, if caching is not allowed then the streaming media content is simply made available for playback (act 308)—if not cached, the content cannot be played back at a later time without re-streaming the content.

Figure 8A:
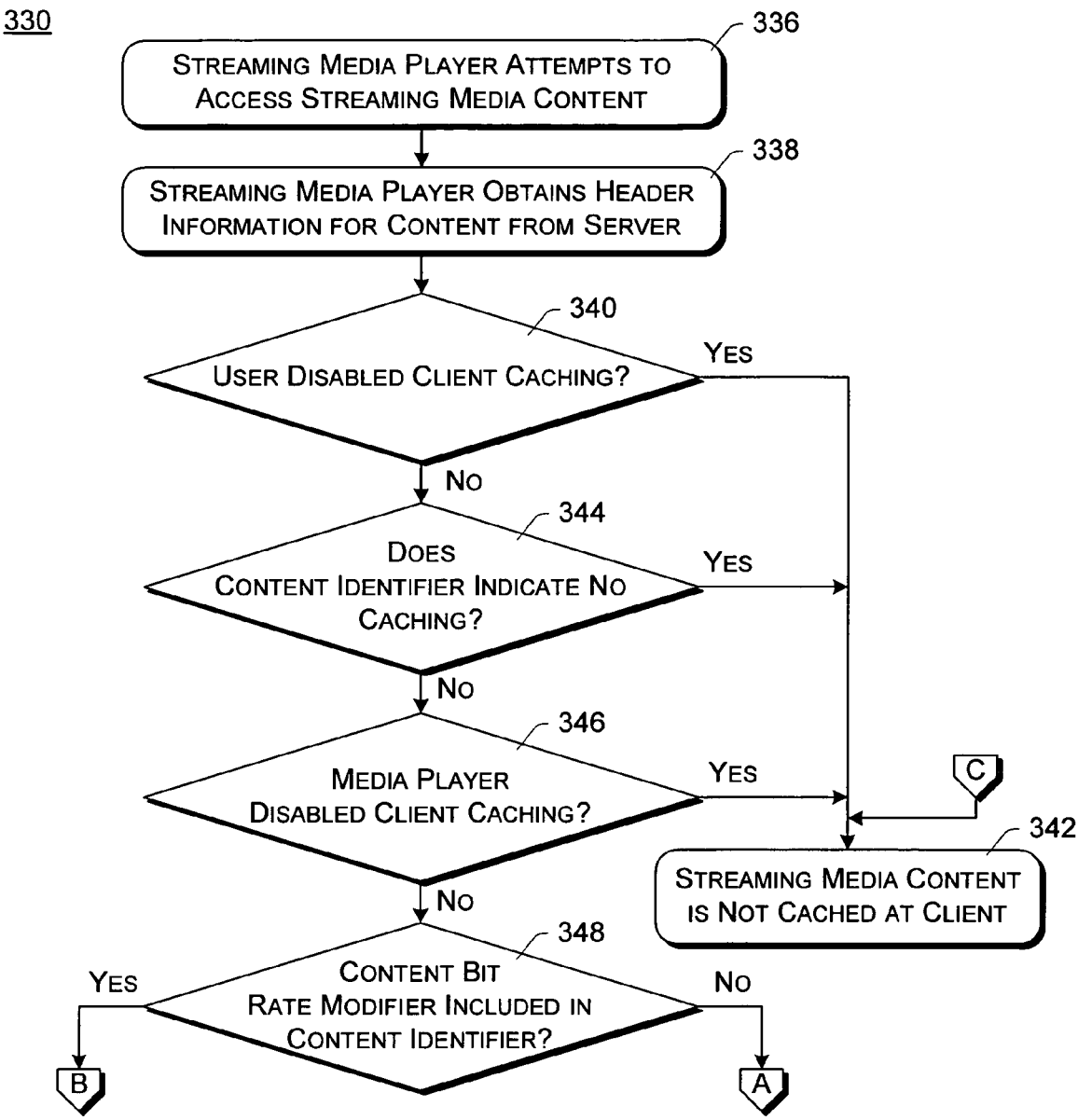
FIGS. 8A and 8B are a flowchart illustrating an exemplary process for determining whether to cache streaming media content on a client device.
Figure 8B:
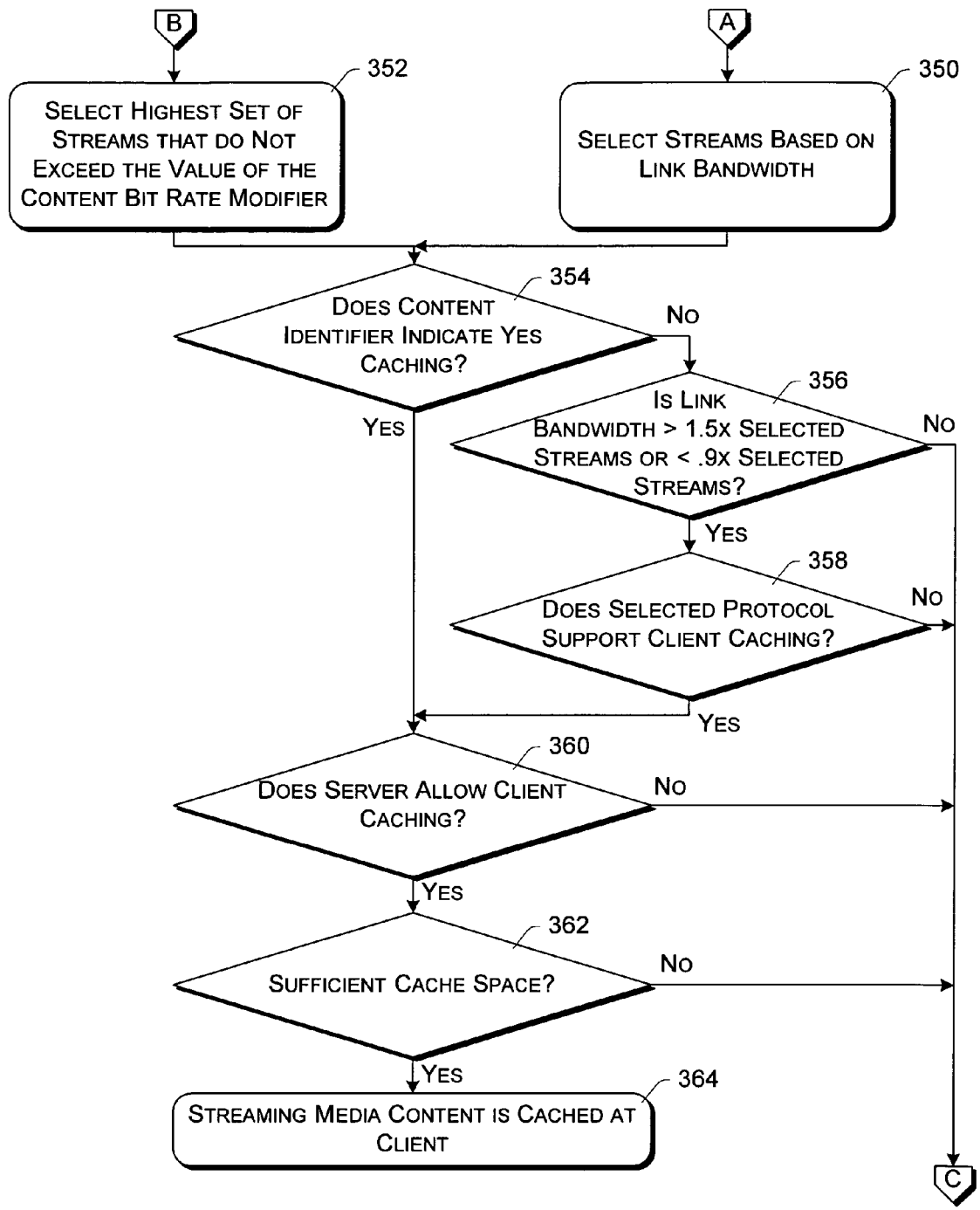

FIGS. 8A and 8B are a flowchart illustrating an exemplary process 330 for determining whether to cache streaming media content on a client device. Process 330 is implemented by a streaming media player of a client device, such as streaming media player 142 of client device 102 of FIG. 2, and may be performed in software, firmware, hardware, or combinations thereof.

Initially, the streaming media player attempts to access streaming media content available from a server device (act 336 of FIG. 8A) and obtains the header information for the streaming media content from the server device (act 338). The streaming media player then checks whether the user has disabled client caching of streaming media content (act 340). If the user has disabled client caching of streaming media content, then the streaming media content is not cached at the client (act 342). However, if the user has not disabled client caching of streaming media content, then the streaming media player checks whether the streaming media content identifier indicates no caching for the content (act 344). If so, then the streaming media content is not cached at the client (act 342).

However, if the streaming media content identifier does not indicate no caching for the content, then the streaming media player checks whether the streaming media player has disabled client caching of streaming media content (act 346). If so, then the streaming media content is not cached at the client (act 342). If not, then the streaming media player checks whether the streaming media content identifier includes a content bit rate modifier (act 348).

If a content bit rate modifier is included then the streaming media player selects the set of streams that have the highest bit rates that do not exceed the value of the content bit rate modifier (act 352 of FIG. 8B). If a content bit rate modifier is not included then the streaming media player selects the set of streams based on the bandwidth between the client and server, also referred to as the link bandwidth (act 350 of FIG. 8B).

Once the streams are selected, the streaming media player proceeds based on whether the streaming media content identifier indicates that the content should be cached (act 354). If not, then the streaming media player checks whether the link bandwidth is greater than 1.5 times the sum of the bit rates of the selected streams or less than 0.9 times the sum of the bit rates of the selected streams (act 356). Alternatively, values other than 1.5 and 0.9 may be used in act 356. If the link bandwidth is not greater than 1.5 times the sum of the bit rates of the selected streams or less than 0.9 times the sum of the bit rates of the selected streams, then the streaming media content is not cached at the client (act 342 of FIG. 8A). However, if the link bandwidth is greater than 1.5 times the sum of the bit rates of the selected streams or less than 0.9 times the sum of the bit rates of the selected streams, then the streaming media player checks whether the selected protocol supports client caching of streaming media content (act 358). In one exemplary implementation, HTTP 1.1 and RTSP using TCP (Transmission Control Protocol) data delivery support client caching of streaming media content.

If the protocol does not support client caching of streaming media content, then the streaming media content is not cached at the client (act 342 of FIG. 8A). If the protocol does support client caching of streaming media content, or if the streaming media content identifier indicates that the content should be cached (act 354), then the streaming media player checks whether the server allows client caching (act 360). If the server does not allow client caching, then the streaming media content is not cached at the client (act 342 of FIG. 8A). However, if the server does allow client caching, then a check is made as to whether there is sufficient space in the cache for the streaming media content (act 362). The amount of space needed to cache the streaming media content can be identified, for example, in the header information received in act 338 of FIG. 8A. Previously cached content may optionally be evicted from the cache if necessary to create sufficient space. If there is not sufficient space in the cache, then the streaming media content is not cached at the client (act 342 of FIG. 8A). However, if there is sufficient space in the cache, then the streaming media content is cached at the client (act 364).

It should be noted that in some situations, such as when the streaming media content is broadcast content, the size of the content may not be known and thus a determination of whether there is sufficient space in the cache (act 362) for all of the content may not be made. In such situations, the content may simply be cached until the cache no longer has sufficient space for any more content, at which point caching of the streaming media content stops. Alternatively, an approximate size of the streaming media content may be made available to the streaming media player, such as in the header information received in act 338 of FIG. 8A (e.g., an expected duration of the broadcast as well as the encoded bit rate of the broadcast streaming media content, from which an approximate size of the broadcast content can be readily determined).

It should also be noted that process 330 of FIGS. 8A and 8B is an exemplary process for determining whether to cache streaming media content on a client device, and that various modifications may be made to process 330. For example, in embodiments where broadcast content is not cached, then an additional act(s) may be included in process 330 to check whether the content is broadcast content, and if so then the content is not cached (act 342). In other embodiments, a check may be made as to whether the content identifier indicates that the content should be cached, and if so, this can override other default settings (e.g., broadcast content may not be cached by default, but may be overridden by an indication in the content identifier that it can be cached). In still other embodiments, a user may not be permitted to disable client caching and thus act 340 need not be included in process 330. In yet other embodiments, a content identifier may not be able to indicate whether content should be cached and thus act 344 need not be included in process 330.

Various processes are illustrated by way of flowcharts herein. It should be noted that the acts involved in these processes can be performed in the order shown in the flowcharts, or alternatively in different orders. For example, in FIGS. 8A and 8B, the acts may be performed in the order shown, or act 360 or act 362 may be performed before act 340, act 346 may be performed before act 344, and so forth.

Figure 9:
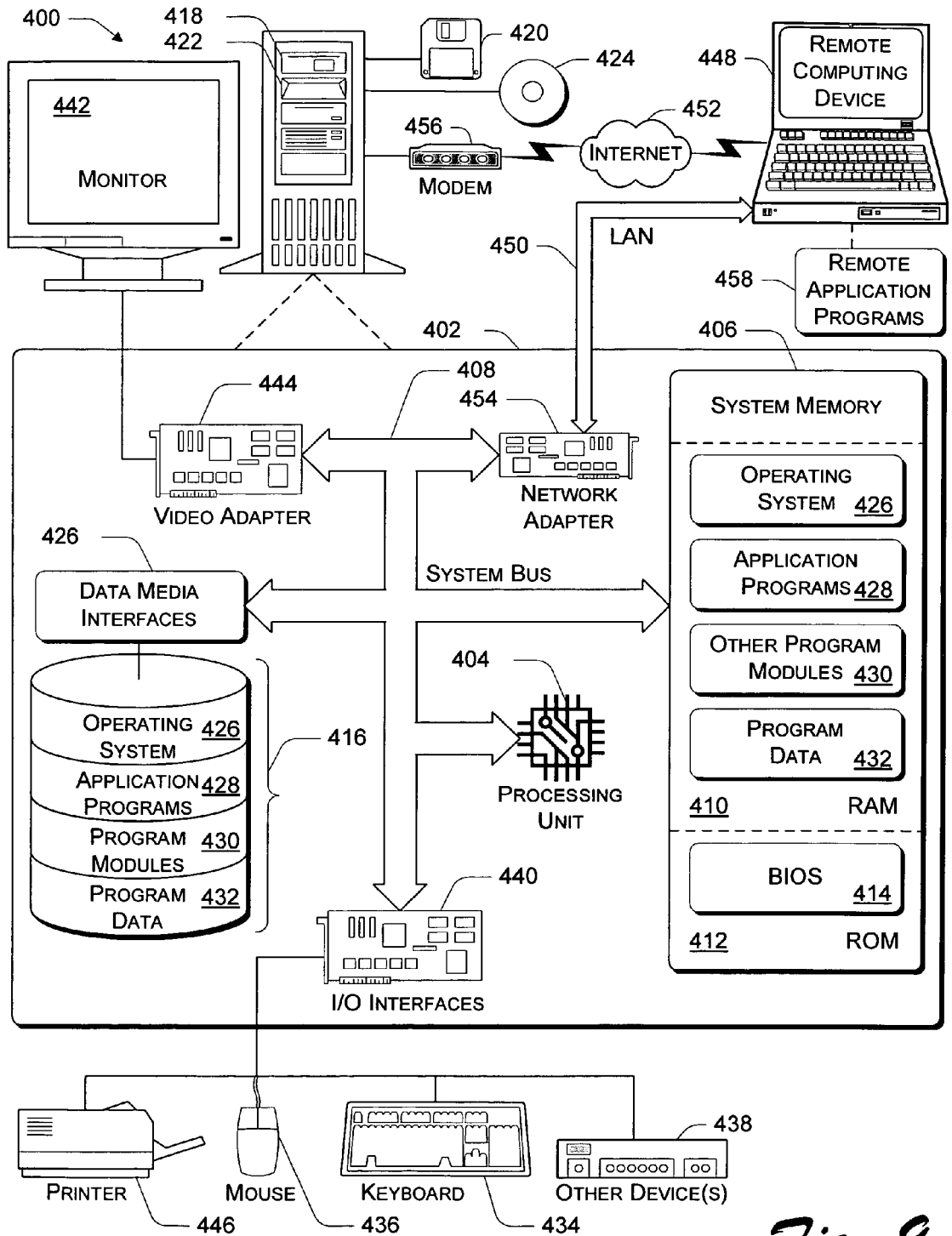
FIG. 9 illustrates an exemplary general computer environment, which can be used to implement the techniques described herein.

FIG. 9 illustrates an exemplary general computer environment 400, which can be used to implement the techniques described herein. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the exemplary computer environment 400.

Computer environment 400 includes a general-purpose computing device in the form of a computer 402. Computer 402 can be, for example, a client 102 or server 104 of FIG. 1, or a client 102 or server 146 of FIG. 2. The components of computer 402 can include, but are not limited to, one or more processors or processing units 404, a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 14 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media".

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method of facilitating a transfer of streaming media data between a server device, a proxy device, and a client device, the method comprising:

receiving, at the proxy device, a first message from the server device, the first message comprising:

a first portion containing data identifying a data structure type;

a second portion containing data identifying a cache control directive to indicate that only a client device is allowed to cache streaming media content associated with the cache control directive, and further identifying one or more headers, the one or more headers including a streaming speed header to indicate a speed at which streaming media content is to be streamed, wherein the speed at which the streaming media is to be streamed is independent of an encoded bit rate of the streaming media content; and a third portion containing data identifying an end of the second portion in the data structure;

based upon the cache control directive, determining that the proxy device is not allowed to cache the streaming media content;

based upon the determination, transmitting the first message to the client device without caching the streaming media content at the proxy device; and sending, from the client device, a second message to the server device, wherein the second message provides details of user actions to the server, the second message comprising:

a logging information header to indicate that a message body portion of the data structure includes logging information for communication to the server device, the logging information regarding playback of streaming media content from a cache at the client device, wherein the logging information comprises:

an amount of time a streaming media player spent playing the streaming media content;

an identification of the portions of the streaming media content that were played multiple times;

an identification of the portions of the streaming media content that were skipped;

a determination of whether playback of the streaming media content was paused;

an identification of the point or points in the streaming media content that were paused; or an identification of a problem with a network connection between the server device and the client device.

2. The method of claim 1, wherein the cache control directive further indicates how caching of the streaming media content is to be handed by the client device.

3. The method of claim 1, wherein the cache control directive further indicates that a streaming media player of the client device is allowed to cache the streaming media content, wherein the indication comprises:

no-cache, user-public.

4. The method of claim 1, wherein the cache control directive further indicates that a streaming media player of the client device is allowed to cache the streaming media content, wherein the indication comprises:

no-user-cache.

5. A computer storage media encoding computer executable instructions that when executed by a computer comprise:

instructions configured to receive, at the proxy device, a first message from the server device, the first message comprising:

a first portion containing data identifying a data structure type;

a second portion containing data identifying a cache control directive to indicate that only a client device is allowed to cache streaming media content associated with the cache control directive, and further identifying one or more headers, the one or more headers including a streaming speed header to indicate a speed at which streaming media content is to be streamed, wherein the speed at which the streaming media is to be streamed is independent of an encoded bit rate of the streaming media content; and a third portion containing data identifying the end of the second portion in the data structure;

based upon the cache control directive, instructions configured to determine that the proxy device is not allowed to cache the streaming media content; and based upon the determination, instructions configured to transmit the first message to the client device without caching the streaming media content at the proxy device; and instructions configured to send, from the client device, a second message to the server device, wherein the second message provides details of user actions to the server, the second message comprising:

a logging information header to indicate that a message body portion of the data structure includes logging information for communication to the server device, the logging information regarding playback of streaming media content from a cache at the client device, wherein the logging information comprises:

an amount of time a streaming media player spent playing the streaming media content;

an identification of the portions of the streaming media content that were played multiple times;

an identification of the portions of the streaming media content that were skipped;

a determination of whether playback of the streaming media content was paused;

an identification of the point or points in the streaming media content that were paused; or an identification of a problem with a network connection between the server device and the client device.

6. The computer storage media of claim 5, wherein the speed at which the streaming media content is to be streamed is represented by a value x, and wherein the streaming speed header comprises:

Pragma: Speed=x.

7. The computer storage media of claim 5, wherein the speed at which the streaming media content is to be streamed is represented by a value x, and wherein the streaming speed header comprises:

Speed=x.

8. The computer storage media of claim 5, wherein the speed at which the streaming media content is to be streamed is a speed requested by a client device that is to receive the streaming media content.

9. The method of claim 1, the method further comprising:

sending, from the client device, a second message to the server device, wherein the second message provides details of user actions to the server, the second message comprising:

a logging information header to indicate that a message body portion of the data structure includes logging information for communication to the server device, the logging information regarding playback of streaming media content from a cache at the client device, wherein the logging information comprises:

an amount of time a streaming media player spent playing the streaming media content;

an identification of the portions of the streaming media content that were played multiple times;

an identification of the portions of the streaming media content that were skipped;

a determination of whether playback of the streaming media content was paused;

an identification of the point or points in the streaming media content that were paused; or an identification of a problem with a network connection between the server device and the client device.

10. The computer storage media of claim 5 further comprising:

instructions configured to send, from the client device, a second message to the server device, wherein the second message provides details of user actions to the server, the second message comprising:

a logging information header to indicate that a message body portion of the data structure includes logging information for communication to the server device, the logging information regarding playback of streaming media content from a cache at the client device, wherein the logging information comprises:

an amount of time a streaming media player spent playing the streaming media content;

an identification of the portions of the streaming media content that were played multiple times;

an identification of the portions of the streaming media content that were skipped;

a determination of whether playback of the streaming media content was paused;

an identification of the point or points in the streaming media content that were paused; or an identification of a problem with a network connection between the server device and the client device.

11. A system for facilitating the transfer of streaming media content, comprising:

a server device adapted to transmit a first message, the first message comprising:

a first portion containing data identifying a data structure type;

a second portion containing data identifying a cache control directive to indicate that only a client device is allowed to cache streaming media content associated with the cache control directive, and further identifying one or more headers, the one or more headers including a streaming speed header to indicate a speed at which streaming media content is to be streamed, wherein the speed at which the streaming media is to be streamed is independent of an encoded bit rate of the streaming media content; and a third portion containing data identifying an end of the second portion in the data structure;

a proxy device adapted to receive the first message from the server device, determine if the proxy device is allowed to cache the streaming media content, and transmit the first message to the client device without caching the streaming media content at the proxy device;

wherein the client device is adapted to receive the first message from the server device, determine if the client device is allowed to cache the streaming media content, and cache the streaming media content at the client device; and wherein the client device is adapted to send a second message to the server device, wherein the second message provides details of user actions to the server, the second message comprising:

a logging information header to indicate that a message body portion of the data structure includes logging information for communication to the server device, the logging information regarding playback of streaming media content from a cache at the client device, wherein the logging information comprises:

an amount of time a streaming media player spent playing the streaming media content;

an identification of the portions of the streaming media content that were played multiple times;

an identification of the portions of the streaming media content that were skipped;

a determination of whether playback of the streaming media content was paused;

an identification of the point or points in the streaming media content that were paused; or an identification of a problem with a network connection between the server device and the client device.

* * * * *